Figure 1:
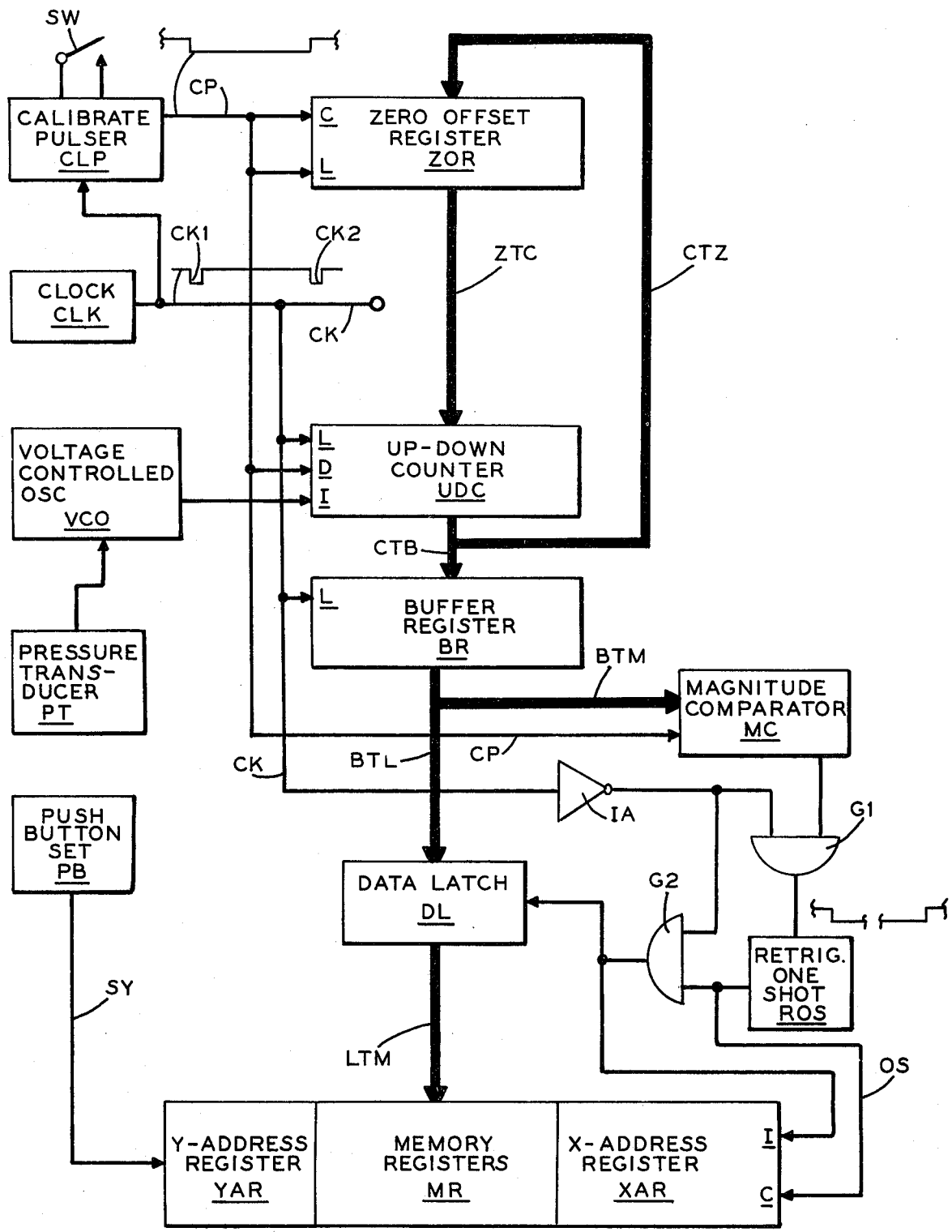

United States Patent [19]

Sternberg et al.

[11] 3,959,769
[45] May 25, 1976

[54] METHOD AND APPARATUS FOR RECORDING A SIGNATURE

[75] Inventors: Jacob Sternberg, New York; Robert W. Freund, Brooklyn, both of N.Y.

[73] Assignee: Veripen, Inc., New York, N.Y.

[22] Filed: June 20, 1974

[21] Appl. No.: 481,138

[52] U.S. Cl. ................. 340/146.3 SY; 340/347 AD
[51] Int. Cl.² .......................................... G06K 9/00
[58] Field of Search ............ 340/146.3 SY, 347 AD, 340/146.3 SG; 73/432 A, 432 AD

[56] References Cited
UNITED STATES PATENTS

| | | |
|---|---|---|
| 3,007,149 | 10/1961 | Brown.......................... 340/347 AD |
| 3,133,266 | 5/1964 | Frishkopf................... 340/146.3 SG |
| 3,349,391 | 10/1967 | Kimura ......................... 340/347 AD |
| 3,579,186 | 5/1971 | Johnson et al.............. 340/146.3 SY |
| 3,618,019 | 11/1971 | Nemirovsky et al........ 340/146.3 SY |
| 3,781,869 | 12/1973 | Sudnick et al................. 340/347 CC |
| 3,824,588 | 7/1974 | Vermillion..................... 340/347 CC |

OTHER PUBLICATIONS

Analog–Digital Conversion Handbook, Analog Devices, Inc., 1972, pp. I-87-I-88.

*Primary Examiner*—Leo H. Boudreau
*Attorney, Agent, or Firm*—Hane, Baxley & Spiecens

[57] ABSTRACT

The pressure exerted while writing a signature is transduced to an electrical analog signal which is periodically converted to a binary coded number representing the average amplitude of the pressure between periodic samplings.

11 Claims, 2 Drawing Figures

METHOD AND APPARATUS FOR RECORDING A SIGNATURE

This invention pertains to identification systems and more particularly to such systems utilizing stored pressure patterns.

Personal identification is required in many areas, such as the admission into classified plants or laboratories, the withdrawal of funds from banks, the picking up of securities, or money or other negotiable instruments by messengers, the charging of goods or services by means of credit cards, etc.

The earliest forms of personal identification relied on were the visual study of signatures. However, it soon became apparent that signature forgeries were quite easy. Accordingly, more sophisticated systems have been proposed, such as finger or handprint comparison, photographic comparisons, etc. While such systems are more reliable than systems utilizing signatures, they require skilled personnel to perform the comparisons. This limitation has been recognized and apparatus has been proposed and built to perform "machine" comparisons. Thus, there is a great demand for mechanically identifying a person which is more reliable than mere visual signature comparison and less complex than fingerprint comparison or its equivalents.

This demand has been satisfied by U.S. Pat. 3,618,019 which teaches a method for checking the identity of a person by comparing a pressure pattern which the person generates while writing his signature with a previously recorded pressure pattern of the signature. The pressure pattern which is an analog signal is converted into a binary-coded word having a group of fields. One field indicates the number of components in the pressure pattern. Another field indicates the peak value of the pressure pattern. A further field indicates the time after the start of the signature when the peak value occurs. The length of the signature is indicated by a further field, and a final field indicates the integral of the pressure pattern.

Each such pressure pattern is stored in a different register of an addressable memory. The address of the register is in one-to-one correspondence with a coded number assigned to the subject. Thus, when a person is to be identified, he enters his code number into the system followed by the writing of his signature. The code number is used to select the pre-recorded pressure pattern's binary word representation for comparison with the binary word representation of the presently generated pressure pattern. A correlation of the two binary words is performed and the degree of similarity is indicated as one of three possible alternatives. If there is a very close correlation there will be given an indication that the signature is verified. If there is a large discrepancy there will be indicated that the signature is not verified. Or, if there is a correlation between these extremes, an ambiguity will be indicated which will result in a request for the rewriting of the signature or other information.

While the method disclosed in the patent worked well it created a demand for more reliable, flexible and sophisticated techniques. Such techniques per se require a more complete representation of the signature than taught in said patent.

It is accordingly a general object of the invention to provide a method for representing a signature by a finite set of discrete digital words wherein the information stored in the set of digital words closely approaches the information stored in a continuous analog signal representation of the pressure exerted between a stylus and a writing surface by a subject when signing his signature.

Briefly, the invention contemplates recording a signature by generating an analog electrical signal having a variable property such as amplitude which represents the continuously variable pressure between a stylus and a writing surface exerted by a subject when signing a signature, periodically sampling the analog electrical signal, and converting the average magnitude of the variable property of the analog electrical signal occurring during each sampling period to a coded combination of bits defining the number representing such average magnitude, and storing the coded combinations of bits as a set of digital words.

Other objects, the features and advantages of the invention will be apparent from the following detailed description when read with the accompanying drawing which shows apparatus for practicing the invention.

Figure 2:
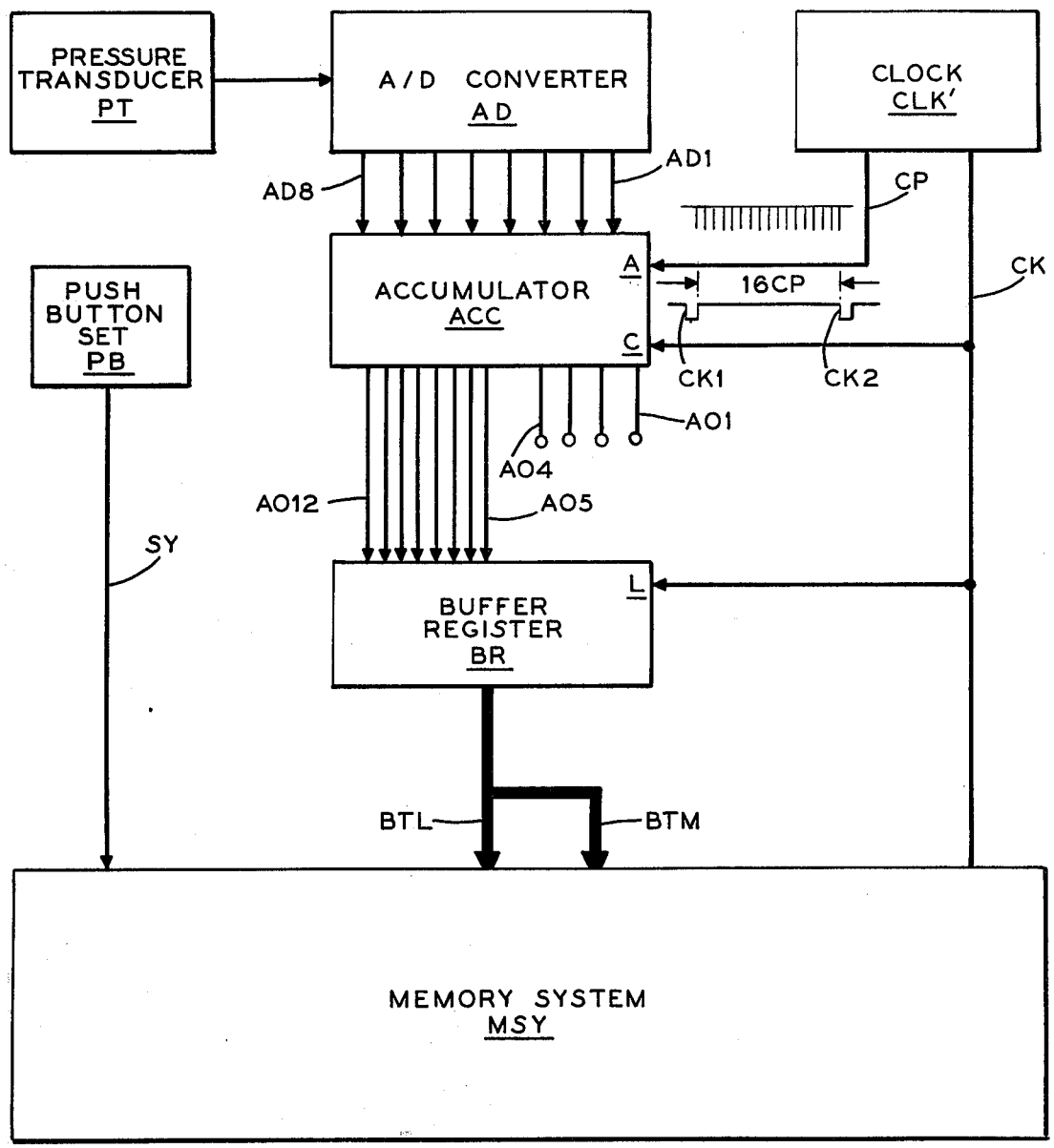

In the drawings:

FIG. 1 is a block diagram of a first embodiment of apparatus for practicing the invention; and FIG. 2 is a block diagram of a second embodiment of such apparatus.

In FIG. 1 a first embodiment of the invention relies on using digital integration techniques to find the average pressure during a sampling period.

The system comprises: a pressure transducer PT which can be a stylus or a pen having a strain gauge and resistance bridge structure for generating an output voltage whose amplitude varies as a functure of the pressure exerted between the stylus and a writing surface; a voltage controlled oscillator VCO which generates a pulse train whose instantaneous pulse repetition rate is directly proportional to the amplitude of the signal received from pressured transducer PT; an up-down counter including twelve positions and having a counting input I, a set of presetting inputs connected to the twelve lines of cable ZTC, a counting direction input D, and the load input L, the counter will accept the number represented on the lines of cable ZTC when receiving a positive going transient at input L and the counter counts up unless input D is low; a buffer register BR having eight stages with inputs respectively connected via the eight data lines of cable CTB to the outputs of the respective eight least significant states of counter UDC; a zero offset register ZOR having 12 stages with inputs respectively connectged via the 12 lines of cable CTZ to the outputs of the respective stages of counter UDC and outputs connected respectively to the 12 lines of cable ZTC: a clear input C which force sets register ZOR to a zero value when receiving a negative going transient, and a load input L which forces the register to the number represented by the signals on cable CTZ when receiving a positive going transient; a magnitude comparator MC which can be an OR-circuit that emits a signal whenever the number received at its inputs connected to the eight lines of cable BTM from the eight stages of buffer register BR exceed a pre-set threshold value and a two-input AND-circuit G1 whose first input is connected to the output of the comparator MC and whose second input in an inhibiting input connected to the line CP to disable the comparator MC when a pulse is present on line CP; two-input AND-circuits G1 and G2; a retriggerable one shot ROS which generates pulses having a duration of, say, 2 seconds whenever triggered from the output of AND-circuit G1; a data latch DL which can be eight two-input AND gates, each having one input connected to the output of AND-gate G2, each having its other input connected via one of the lines of cable BTL to the output of one of the stages of buffer register BR and each having an output connected to one of the lines of eight line cable LTM; a random access memory having a plurality of memory registers MR selected by Y-address register YAR and X-address register XAR, and having inputs connected to the eight lines of cable LTM, the register YAR can be a static register which is loaded by signals on line SY, register XAR can be an up counter which is unit incremented each time it receives a signal at input I from the output of AND-circuit G2, and which is cleared whenever it receives a positive going transient at input C connected to line OS; push button set PB which can be a series of switches which generate the coded combination of signals representing the Y-addresses; a clock CLK which generates, say, 5 microsecond pulses as shown on line CK at a repetition rate of 500 a second; and a calibrate pulser CLP which when switch SW is momentarily closed generates the pulse shown on line CP having a leading edge coincident with one of the pulses on line CK and a trailing edge coincident with the next pulse on line CK.

Before actual operation and periodically thereafter, it is necessary to calibrate the system for any drift in the transducer output. The calibration is performed by momentarily closing switch SW shown symbolically as a mechanical switch but which is more likely an electrical switch. When the switch is closed a pulse having a duration of the period between two clock pulses is present on line CP. The leading edge of this pulse force sets zero offset register ZOR to zero.

For the duration of this pulse the input D of counter UDC controls the counter to decrement and inhibits operation of magnitude comparator MC. (Note the leading edge of clock pulse CK 1 is coincident with the leading edge of the pulse on line CP and the leading edge of clock pulse CK 2 is coincident with the trailing edge of the pulse on line CP.) At the trailing edge of clock pulse CK 1 zero in register ZOR is loaded into counter UDC which is set as a down counter. Whatever the voltage is then being emitted by the transducer PT it results in pulses of a frequency corresponding to that voltage being fed by oscillator VCO to counter UDC. At the start of clock pulse CK2 the pulse on line CP terminates and the number in counter UDC is fed via the lines of cable CTZ to zero offset register ZOR. This number is an offset number which is used for every pressure measurement until another offset routine is performed.

Now, when a subject is to enter his signature, he first sets in his registration number by operating push button set PB. The registration number is loaded in Y-address register YAR to be used to select the set of registers assigned to the subject. The particular registers of the set are selected by the X-address register as hereinafter described.

All this time the following routine is progressing. At the trailing edge of a clock pulse on line CK, the offset number is non-destructively read from register ZOR into counter UDC which unit increments to accumulate a "pressure number." At the leading edge of the next clock pulse, the signed number accumulated in counter UDC is transferred to buffer register BR. As long as this number is not greater than seven representing a threshold transducer pressure, nothing further happens.

However, the first time the transducer pressure PT exceeds this threshold pressure indicating a signature is starting to be signed, the number then accumulated in the sampling period will be greater than seven. Magnitude comparator MC emits a signal to alert AND-circuit G2 which passes a clock pulse on line CK to retriggerable one shot ROS. One shot ROS transmits a signal on line OS to initialize the counter of register XAR for selecting the first register of the selected set of registers. In addition, the signal at the output of one shot ROS alerts AND-circuit G2 to pass the clock pulse on line CK to data latch DL which passes the number then in the buffer register BR via cable BTL and cable LTM into the selected first register. These number transfers now continue in the same manner for each sampling period regardless of the amplitude of the pressure. Note that each subsequent clock pulse on line CK unit increments the counter in register XAR so that the subsequent registers of the selected set sequentially accept the numbers. The transfers continue until there has been a time lapse of 2 seconds during which the amplitude of the pressure is below the threshold. This means that one shot ROS has not been triggered for 2 seconds and its output voltage as shown on line OS returns to its off state. Thus AND-circuit G2 is blocked causing the opening of the data latch DL. Since it is assumed that no one will hesitate more than 2 seconds during the signing of a signature, a 2 second hiatus indicates that a signature has been completed.

The embodiment of FIG. 2 relies on the technique of taking the arithmetic averages of pluralities of samples within specific time intervals. The system of FIG. 2 is in some ways similar to the system of FIG. 1 and in some ways different. For example, the zero offset portion of the system of FIG. 1 is not specifically included in the system of FIG. 2 solely to simplify the teaching by not disclosing redundant information. In addition, the following elements are the same as those in the system of FIG. 1; the push button set PB; the pressure transducer PT; the memory system MSY which consists of the magnitude comparator MC, the AND-circuit G1 and G2, the data latch DL, the retriggerable one shot ROS, the memory register MR, the Y-address register YAR and the X-address register XAR.

The remainder of the system includes an analog-to-digital converter AD which converts the analog voltage received from the pressure transducer PT to an eight bit binary number transmitted on lines AD1 to AD8; a 12 place accumulator ACC which adds the binary number represented on lines AD1 to AD8 to the contents of its 12 place register each time a pulse is received on the add input A from line CP and which is cleared when a positive transient is present on line CK, the eight most significant stages of the accumulator are connected to lines AO5 and AO12; a buffer register BR which is an eight stage flip-flop register wherein the inputs of each flip-flop are respectively connected to the lines AO5 and AO12 so that an eight bit binary number is accepted each time a negative going transient is present on load input L from line CK, and the outputs of the flip-flop are connected respectively to the lines of cable BTL and BTM in the same manner as in FIG. 1; and a clock generator CLK prime which generates clock pulses at a given repetition rate of, say, 320 per second and generates transfer pulses such as pulses CK1 and CK2 on line CK which are in synchronism with the pulses on line CP and have a rate of 20 pulses per second.

In operation, the instantaneous analog voltage generated by pressure transducer PT is converted by converter AD into an eight bit binary number fed on lines AD1 to AD8. If it is assumed that the operation is at the time when the trailing edge of pulse CK1 is present, then the accumulator ACC is cleared to zero. When the first pulse occurs on line CP after the clearing, the binary number from converter AD is added to the zero contents of the register in the accumulator ACC to give a first number. When the second such pulse occurs the binary number then at the output of the converter AD is added to said first number. After sixteen clock pulses have occurred, the accumulator register holds the sum of 16 samples of the output of the converter AD. Now, note that the eight most significant stages of the accumulator register are fed via lines AO5 to AO12 buffer register BR when the leading edge of the CK2 pulse occurs. In effect, the sum stored in the accumulator ACC divided by 16 is received by buffer register BR. Thereafter the number in buffer register BR is handled by the memory system MSY just as numbers stored in such register are handled in the system of FIG. 1. Hence, the system of FIG. 2 also stores numbers representing the average pressured over discrete sampling periods.

While only two embodiments of the invention have been shown and described in detail there will now be obvious to those skilled in the art many modifications or variations. For example, the pulse frequencies and number sizes are purely exemplary and larger or smaller values could be used. In addition, each of the elements such as the registers, accumulator, counter and comparator are representative and their functions can be performed by other elements or even by a suitable programmed minicomputer without departing from the spirit of the invention as defined by the appended claims.

What is claimed is:

1. Method of recording a signature comprising the steps of generating an analog electrical signal having a variable property which represents the variable pressure between a stylus and writing surface exerted by a subject when signing a signature, performing a plurality of periodically occurring samplings of the analog electrical signal during the signing of the signature wherein each sampling requires a given period of time, generating for each sampling a coded combination of bits defining a number related to the amplitude of the variable property of the analog electrical signal during the given period of time whereby a plurality of coded combinations of bits defining numbers representing the variable property are generated during the signing of the signature, forming a reference coded combination of bits defining an offset number representing the amplitude of the variable property of the analog electrical signal when the subject is not signing a signature, and subtracting the offset number from each of said numbers representing the variable property of the analog electrical signal.

2. The method of claim 1 further comprising the step of storing only those coded combinations of bits representing remainder numbers after the subtractions which are greater than a prechosen value.

3. The method of claim 1 wherein the generating step comprises periodically converting a number of times during each given period of time the instantaneous amplitude of the analog electrical signal to a digital number, adding all such digital numbers occurring during the given period of time to form a digital sum number and dividing the digital sum number by a value related to the number of conversions performed during the given period of time to form a digital quotient number, said digital quotient number being expressed by said coded combination of bits.

4. The method of claim 1 wherein the generating step comprises generating a pulse train whose instantaneous pulse repetition rate is proportional to the instantaneous amplitude of the analog electrical signal and counting the number of pulses of the pulse train which occur during each sampling period.

5. The method of claim 4 wherein only the coded combinations of bits representing numbers greater than a prechosen value are stored.

6. The method of claim 4 further comprising the step of generating a reference coded combination of bits defining an offset number representing the magnitude of the variable property of the analog electrical signal when the subject is not signing a signature, and subtracting the offset number from each of said numbers representing the variable property of the analog electrical signal.

7. Method of recording a signature comprising the steps of generating an analog electrical signal having a variable property which represents the variable pressure between a stylus and writing surface exerted by a subject when signing a signature, performing a plurality of periodically occurring samplings of the analog electrical signal during the signing of the signature wherein each sampling requires a given period of time, generating for each sampling a coded combination of bits defining a number related to the amplitude of the variable property of the analog electrical signal during the given period of time whereby a plurality of coded combinations of bits defining numbers are generated during the signing of the signature, storing the coded combinations of bits defining numbers, and giving an indication whenever, after a predetermined pressure is present, a pressure greater than said predetermined pressure is not present for a predetermined period of time.

8. Apparatus for recording a signature comprising generating means for generating an analog electrical signal having a variable property representing the continuous variable pressure between a stylus and a writing surface exerted by a subject when signing a signature, converting means for periodically converting the analog electrical signal to coded combinations of bits defining first digital numbers related to the magnitude of said variable property during predetermined time intervals during the signing of a signature, means for generating an offset digital number related to the value of the analog electrical signal when a subject is not signing a signature, means for subtracting the offset digital number from each of the first digital numbers to form remainder digital numbers and means for storing coded combinations of bits representing said remainder digital numbers.

9. The apparatus of claim 8 wherein said converting means comprises means for generating a pulse train whose instantaneous pulse repetition rate is proportional to the instantaneous amplitude of the analog electrical signal, and means for counting the number of pulses occuring during the predetermined time intervals.

10. The apparatus of claim 8 wherein said converting means comprises means for periodically translating the instantaneous amplitude of the analog electrical signal to a binary coded number.

11. The apparatus of claim 10 wherein the periodic translating occurs a given integer multiple number of times during each of said predetermined time intervals and further comprising means for summing said binary coded numbers, generated during each of said predetermined time intervals and means for dividing at the end of each of said predetermined time intervals the sum of said binary coded numbers formed during the predetermined time interval by the given integer.

* * * * *